United States Patent Office 2,807,653
Patented Sept. 24, 1957

2,807,653
PRODUCTION OF BIS-PHENOLS

Allen H. Filbey, Walled Lake, and Thomas H. Coffield, Birmingham, Mich., assignors to Ethyl Corporation, New York, N. Y., a corporation of Delaware No Drawing. Application September 23, 1955, Serial No. 536,317

12 Claims. (Cl. 260—619)

This invention relates to a novel and useful process for the preparation of di - (dialkyl - hydroxyphenyl) - methanes.

Di - (3,5 - dialkyl-hydroxyphenyl)methanes are useful antioxidanats. For example, 1,1 - bis - (3 - tert-butyl-5-methyl-2-hydroxyphenyl)methane and 1,1 - bis - (3 - tert-butyl-5-ethyl - 2 - hydroxyphenyl)methane have attained commercial significance as rubber antioxidants because of their antioxidant properties and nonstaining characteristics. More recently, 1,1 - bis-(3,5-di-tert-butyl-4-hydroxyphenyl)methane has been found to be a superlative antioxidant for use in lubricating and other industrial oils and the like. Certain di-(3,5-dialkyl-hydroxyphenyl)-methanes are also useful as feed supplements for controlling coccidiosis in poultry.

An object of this invention is to provide a novel chemical process of preparing di-(3,5-dialkyl-hydroxyphenyl)-methanes which are useful in the chemical arts. Another object is to provide a novel base-catalyzed process for the preparation of di-(3,5-dialkyl-hydroxyphenyl)methanes. A further object is to provide a chemical condensation process of preparing di-(3,5-dialkyl-hydroxyphenyl)-methanes which possesses many important advantages over prior processes. Other important objects of this invention will be apparent from the ensuing description.

The above and other objects of this invention are accomplished by providing a process of preparing di-(3,5-dialkyl-hydroxyphenyl)methanes which comprises reacting a dialkyl phenol having the formula

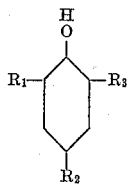

wherein $R_1$ is an alkyl radical containing from 3 to 8 carbon atoms is branched on the alpha carbon atom and $R_2$ and $R_3$ are selected from the group consisting of hydrogen and alkyl radicals containing from 1 to 8 carbon atoms, one of $R_2$ and $R_3$ being hydrogen and the other being an alkyl radical containing from 1 to 8 carbon atoms with an aldehyde having from 1 to 10 carbon atoms in the presence of a catalytic quantity of an alkali metal hydroxide catalyst and in a solvent consisting essentially of a monohydric alcohol having from 1 to about 8 carbon atoms; said dialkyl phenol and said aldehyde being in a mole ratio of approximately 2:1 respectively.

The process of this invention can be used to prepare two types of di-(3,5-dialkyl-hydroxyphenyl)methanes. One type results by reacting a 2,4-dialkyl phenol as above-described—i. e. when $R_1$ is as above-defined and $R_2$ and $R_3$ of the above general formula are respectively an alkyl radical containing from 1 to 8 carbon atoms and hydrogen—with an aldehyde as above-defined under the conditions of the process of this invention. This type of di-(3,5-dialkyl-hydroxyphenyl)methane can be represented by the general formula

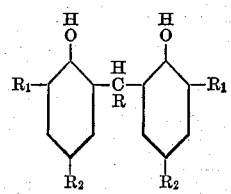

wherein R is selected from the group consisting of hydrogen and hydrocarbon radicals containing up to 9 carbon atoms, the radicals designated by $R_1$ are alkyl radicals containing from 3 to 8 carbon atoms which are branched on their alpha carbon atoms, and the groups designated as $R_2$ are alkyl radicals containing from 1 to 8 carbon atoms. Thus, these compounds are 1,1-bis-(3,5-diakyl-2-hydroxyphenyl)methanes.

The process of this invention is particularly applicable to the preparation of 1,1-bis-(3,5-dialkyl-4-hydroxyphenyl)methanes. These compounds result when the phenol employed in the process of this invention is a 2,6-dialkyl phenol, i. e. when $R_1$ of the first presented chemical formula is an alkyl radical containing from 3 to 8 carbon atoms and is branched on the alpha carbon atom and $R_2$ and $R_3$ are respectively hydrogen and an alkyl radical containing from 1 to 8 carbon atoms. Thus, this second type of di-(3,5-dialkyl-hydroxyphenyl)methane which is readily prepared in good yield and high purity by the process of this invention can be represented by the general formula

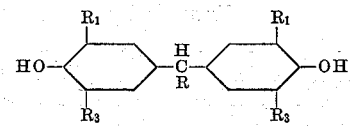

wherein R is selected from the group consisting of hydrogen and hydrocarbon radicals containing up to 9 carbon atoms, the groups designated as $R_1$ are alkyl radicals containing from 3 to 8 carbon atoms and are branched on their alpha carbon atoms and $R_3$ are alkyl radicals containing from 1 to 8 carbon atoms. While the process of this invention is applicable to the preparation of either of the aforementioned two types of di-(3,5-diakyl-hydroxyphenyl)methanes it is eminently suited for the preparation of the di-(3,5-dialkyl-4-hydroxyphenyl)methanes. Thus, a preferred embodiment of this invention is the process of preparing di-(3,5-dialkyl-4-hydroxyphenyl)-methanes which comprises reacting a 2,6-dialkyl phenol in which one alkyl radical contains from 3 to 8 carbon atoms and is branched on the alpha carbon atom and the other alkyl radical contains from 1 to 8 carbon atoms with an aldehyde having from 1 to 10 carbon atoms in the presence of a catalytic quantity of an alkali metal hydroxide catalyst and in a solvent consisting essentially of a monohydric alcohol having from 1 to about 8 carbon atoms; said 2,6-dialkyl phenol and said aldehyde being in a mole ratio of approximately 2:1 respectively.

The process of this invention possesses a number of important advantages. For example, di - (3,5 - dialkyl-hydroxyphenyl)methanes are obtained in very high yield and in high purity. Moreover, reaction time is short and the catalyst and reaction solvents are inexpensive and readily available. Furthermore, the process of this invention is not fraught with the difficulties of prior processes involving use of acid catalysts, namely, the difficulty resulting from the susceptibility of highly branched alkyl phenols of undergoing dealkylation when in the presence of acid catalysts. The preferred embodiment of this invention possesses still further advantages. For example, 2,6-dialkyl phenols are condensed with aldehydes only with great difficulty when conventional acid catalysts are used. Thus, the preferred process of this invention enables the attainment of high yields which heretofore have been unattainable. Furthermore, the preferred process of this invention results in high purity of product because dealkylation is avoided and because ether formation, involving solvent participation which would occur were it not for the fact that catalytic amounts of base are used, is not encountered.

A particularly preferred process of this invention is the process of preparing di-(3,5-di-tert-alkyl-4-hydroxyphenyl)-methanes which comprises reacting a 2,6-di-tert-alkyl phenol with an aldehyde having from 1 to 10 carbon atoms in the presence of a catalytic quantity of an alkali metal hydroxide catalyst and in a solvent consisting essentially of isopropanol; said 2,6-di-tert-alkyl phenol and said aldehyde being in a mole ratio of approximately 2:1 respectively. The particular feature of this embodiment of the invention is that isopropanol is an elegant solvent for the reaction. By conducting this reaction in isopropanol the particular products formed by the condensation of two moles of 2,6-di-tert-alkyl phenol per mole of aldehyde are readily isolated in high purity. Thus, these particular products readily crystallize from the isopropanol on completion of the reaction and the reaction mixture need only be filtered in order to isolate the valuable products. While this desirable property is possessed by certain other alcohols, isopropanol exhibits this characteristic much more prominently. Ancillary advantages in using isopropanol as solvent include its availability and low cost.

The process of the present invention will be further apparent from the following specific examples wherein all parts and percentages are by weight.

*Example I*

In a reaction vessel equipped with stirring means, condensing means, thermometer and reagent introducing means was placed a solution of 6.6 parts of potassium hydroxide dissolved in 400 parts of isopropanol. To this stirred solution maintained under nitrogen atmosphere was added 206 parts of 2,6-di-tert-butyl-phenol. At a temperature of 30° C. a total of 45.4 parts of 37 percent formalin solution was added dropwise. On heating to 60° C. a red color developed and a precipitation of crystalline product began. The mixture was stirred for 1½ hours at 60° C., cooled and the solid filtered off. The product was washed twice with 200 parts of isopropanol containing 10 parts of concentrated hydrochloric acid. After drying the yield of product was 87 percent, melting point 154 to 155° C. The following chemical analysis showed the compound to be 1,1-bis-(3,5-di-tert-butyl-4-hydroxyphenyl)methane: Calculated for $C_{29}H_{44}O_2$ carbon, 82.2 percent, hydrogen, 10.4 percent. Found: carbon, 81.8 percent, hydrogen, 10.5 percent.

*Example II*

In the apparatus described in Example I was placed a solution of 6.6 parts of potassium hydroxide dissolved in 400 parts of isopropyl alcohol. To this solution was added 164 parts of 2-methyl-6-tert-butylphenol and 45.3 parts of 37 percent formalin solution while maintaining an atmosphere of nitrogen in the reaction vessel. The reaction mixture was heated for 2½ hours, cooled and poured into 1500 parts of cold water. The organic material was extracted with ethyl ether, the ether solution dried over magnesium sulfate and evaporated leaving a pale yellow liquid which slowly solidified to give a crystalline product, melting point 96.5 to 98.5° C. This product was 1,1-bis-(3-methyl-5-tert-butyl-4-hydroxyphenyl)methane. Calculated for $C_{23}H_{32}O_2$: carbon, 81.1 percent, hydrogen, 9.47 percent. Found: carbon, 80.6 percent, hydrogen, 9.3 percent.

*Example III*

In the apparatus described in Example I was placed a solution of 6.6 parts potassium hydroxide dissolved in 400 parts of isopropyl alcohol. To this solution under nitrogen was added 206 parts of 2,6-di-tert-butylphenol and 53 parts of benzaldehyde. Toward the end of the benzaldehyde addition solids began to appear in the reaction vessel. After stirring for 2 hours at 40° C. the solids were filtered off to give a good yield of product, melting point 161 to 163° C. This material analyzed correctly for 1,1-bis-(3,5-di-tert-4-hydroxyphenyl)phenyl methane. Calculated for $C_{35}H_{48}O_2$: carbon, 83.95 percent, hydrogen, 9.66 percent. Found: carbon, 83.8 percent, hydrogen, 9.6 percent.

*Example IV*

Using the reaction equipment of Example I, 178 parts of 2,6-diisopropyl phenol is reacted with 45.3 parts of 37 percent of formalin solution in the presence of 6.6 parts of potassium hydroxide. 400 parts of isopropanol is used as the solvent. The reaction temperature is 50° C. A good yield of 1,1-bis-(3,5-diisopropyl-4-hydroxyphenyl)-methane is obtained by hydrolyzing the reaction mixture and extracting the product with ethyl ether. Evaporation of the ether solution gives an oil which slowly crystallizes.

*Example V*

Using the reaction equipment described in Example I, 150 parts of 2-methyl-6-isopropyl phenol is reacted with 31 parts of propionaldehyde in the presence of 4 parts of sodium hydroxide as catalyst. The solvent used is 400 parts of n-propanol. The reaction is conducted at a temperature of 65° C. On completion the reaction mixture is hydrolyzed with water, extracted with ether, the ether evaporated, and the product purified by distillation. The product is 1,1-bis-(3-methyl-5-isopropyl-4-hydroxyphenyl)ethyl methane.

*Example VI*

318 parts of 2,6-di-(2-octyl)phenol is reacted with 63 parts of heptaldehyde in the presence of 3 parts of sodium hydroxide as catalyst. The reaction is conducted in the presence of ethanol at a temperature of 70° C. The product of this reaction, 1,1-bis-(3,5-di-(2-octyl)-4-hydroxyphenyl)hexyl methane, is obtained in good yield by filtration of the reaction mixture after partial evaporation of the ethanol solvent.

*Example VII*

182 parts of 2-isopropyl-6-tert-butylphenol is reacted with 75 parts of nonaldehyde in the presence of 3 parts of lithium hydroxide as catalyst. This mixture is heated to 50° C. in 400 parts of methanol as reaction solvent. The product of this reaction, 1,1-bis-(3-isopropyl-5-tert-butyl-4-hydroxyphenyl)octyl methane, is recovered in high yield from the reaction mixture by filtration after partial evaporation of the methanol solvent.

*Example VIII*

1,1-bis-(3-ethyl-5-isopropyl-4-hydroxyphenyl)methyl methane is prepared by reacting 164 parts of 2-ethyl-6-isopropyl phenol with 25 parts of acetaldehyde in the presence of 4 parts of sodium hydroxide as catalyst and 400 parts of n-octanol as solvent. The reaction temperature is 80° C. On completion of the reaction, the n-octanol solvent is removed from the reaction mixture by distillation at 5 millimeters of mercury pressure. The 1,1-bis-(3-ethyl-5-isopropyl-4-hydroxyphenyl)methyl methane is then recovered from the reaction residue liquor by distillation.

*Example IX*

Using the reaction equipment described in Example I 164 parts of 2-tert-butyl-4-methyl phenol is reacted with 45.3 parts of 37 percent formalin solution in the presence of 4 parts of sodium hydroxide as catalyst. 400 parts of n-propanol is used as reaction solvent. The temperature of the reaction is 55° C. After partial evaporation of the n-propanol solvent, the product, 1,1-bis-(3-tert-butyl-5-methyl-2-hydroxyphenyl)methane, is recovered from the residual solvent by crystallization.

*Example X*

1,1 - bis - (3 - tert - butyl - 5 - ethyl - 2 - hydroxyphenyl)methane is prepared by reacting 178 parts of 2-tert-butyl-4-ethyl phenol with 45.3 parts of 37 percent of formalin solution. The catalyst for the reaction is 6.6 parts of potassium hydroxide and the reaction is conducted in 400 parts of isopropanol as solvent. The temperature of the reaction is 60° C. After evaporation of the isopropanol the product is recovered by crystallization from ligroin.

*Example XI*

150 parts of 2-isopropyl-4-methyl phenol is reacted with 40 parts of n-butyraldehyde in the presence of 6.6 parts potassium hydroxide as catalyst. The solvent is 400 parts of n-hexanol. The reaction temperature is held at 60° C. On completion of the reaction the hexanol solvent is removed by distillation at a pressure of 10 millimeters of mercury, 1,1-bis-(3-isopropyl-5-methyl-2-hydroxyphenyl)n-propyl methane is then recovered by distillation as a light yellow oil which slowly crystallizes.

*Example XII*

1,1 - bis - (3 - (1,1,3,3 - tetramethyl butyl) - 5 - methyl-2-hydroxyphenyl)methyl methane is prepared as follows: 220 parts of 2-(1,1,3,3-tetramethyl butyl)-4-methyl phenol is reacted with 25 parts of acetaldehyde in 400 parts of Oxo amyl alcohols as solvent. 6.6 parts of potassium hydroxide is used as condensation catalyst. The reaction temperature is 65° C. After evaporating off Oxo amyl alcohol solvent the product is recovered from the residual liquor by crystallization from ligroin.

*Example XIII*

Using 400 parts of isopropanol as solvent and 4 parts of sodium hydroxide as catalyst, 208 parts of 2,4-di-tert-butyl-phenol is reacted with 60 parts of p-tolualdehyde at a temperature of 70° C. 1,1-bis-(3,5-di-tert-butyl-2-hydroxyphenyl)-p-tolyl methane is recovered from the reaction mixture by filtration.

*Example XIV*

192 parts of 2-isopropyl-4-tert-butylphenol is reacted with 45 parts of pivalic aldehyde in the presence of 3 parts of lithium hydroxide as catalyst. 400 parts of isopropanol is used as solvent. The reaction temperature is 65° C. Crystallization of the reaction mixture followed by filtration leads to the recovery of 1,1-bis-(3-isopropyl-5-tert-butyl-2-hydroxyphenyl)tert-butyl methane.

The above examples are presented for illustrative purposes only. Other modes of carrying out the process of this invention will now be apparent to one skilled in the art.

It will be understood that the two types of di-(3,5-dialkyl-hydroxyphenyl)methanes which can be prepared by the process of this invention are not equivalent insofar as their properties and hence utilities are concerned. The fact of the matter is that the di-(3,5-dialkyl-2-hydroxyphenyl)methanes and di-(3,5-dialkyl-4-hydroxyphenyl)methanes are equivalent only to the extent that they both can be prepared according to the process of this invention. For example, the di-(3,5-dialkyl-2-hydroxyphenyl)methanes are good antioxidants. However, certain di-(3,5-dialkyl-4-hydroxyphenyl)methanes and in particular 1,1-bis-(3,5-di-tert-butyl-4-hydroxyphenyl)methane are superlative antioxidants for use in lubricating and other industrial oils and the like. It has been found that 1,1-bis-(3,5-di-tert-butyl-4-hydroxyphenyl)methane is among the most effective antioxidants for lubricating and industrial oils known.

Not only are the above two types of di-(3,5-dialkylhydroxyphenyl)methanes not equivalent to each other in properties and utilities but even among the respective classes there exists non-equivalency. To illustrate, it has heretofore been pointed out that of the di-(3,5-dialkyl-2-hydroxyphenyl)-methanes, those having branched chain alkyl groups in the 3 positions and straight chained alkyl radicals from 1 to 3 carbon atoms in the respective 5 positions are most effective as antioxidants for rubber. Among the di-(3,5-dialkyl-4-hydroxyphenyl)methanes, those compounds in which all of the alkyl groups are branched on the alpha carbon atoms are most effective antioxidants. 1,1-bis-(3,5-di-tert-butyl-4-hydroxyphenyl)-methane is the outstanding member of this class.

The phenols used in conducting the process of this invention comprise two types: 2,4-dialkyl phenols and 2,6-dialkyl phenols wherein the alkyl groups are as defined hereinabove. Illustrative 2,4-dialkyl phenols which can be used in the process of this invention include 2-isopropyl-4-methyl phenol, 2-isopropyl-4-ethyl phenol, 2-isopropyl-4-n-propyl phenol, 2,4-diisopropyl phenol, 2-isopropyl-4-n-butyl phenol, 2-isopropyl-4-isobutyl phenol, 2-isopropyl-4-sec-butyl phenol, 2-isopropyl-4-tert-butyl phenol, 2-isopropyl-4-n-hexyl phenol, 2-isopropyl-4-(2-heptyl)-phenol, 2-isopropyl-4-(3-octyl)phenol, 2-sec-butyl-4-ethyl phenol, 2-sec-butyl-4-isopropyl phenol, 2-sec-butyl-4-isobutyl phenol, 2-sec-butyl-4-tert-butyl phenol, 2-tert-butyl-4-methyl phenol, 2-tert-butyl-4-isopropyl phenol, 2-tert-butyl-4-sec-butyl phenol, 2-tert-amyl-4-n-butyl phenol, 2-tert-amyl-4-n-hexyl phenol, 2-tert-amyl-4-(2-heptyl)phenol, 2-(2-hexyl)-4-n-propyl phenol, 2-(2-hexyl)-4-ethyl phenol, 2-(-hexyl)-4-(3-octyl)phenol, 2-(4-octyl)-4-methyl phenol, 2-(4-octyl)-4-tert-butyl phenol, 2-(4-octyl)-4-isobutyl phenol, and the like.

A preferred embodiment of this invention involves use as reactants of such 2,6-dialkyl phenols as 2-isopropyl-6-methyl phenol, 2-isopropyl-6-ethyl phenol, 2,6-diisopropyl phenol, 2-isopropyl-6-tert-butyl phenol, 2-sec-butyl-6-methyl phenol, 2-sec-butyl-6-ethyl phenol, 2-sec-butyl-6-n-propyl phenol, 2-tert-butyl-6-methyl phenol, 2-tert-butyl-6-ethyl phenol, 2-tert-butyl-6-n-butyl phenol, 2-(2-amyl)-6-methyl phenol, 2-(3-hexyl)-6-ethyl phenol, 2-(2-heptyl)-6-n-propyl phenol, 2-(2-octyl)-6-methyl phenol, 2-isopropyl-6-(2-hexyl)phenol, 2-isopropyl-6-(3-heptyl)-phenol, 2-isopropyl-6-(1,1,3,3-tetramethylbutyl)phenol, and the like. The most preferred embodiment of this invention involves use of such 2,6-dialkyl phenols as 2,6-di-tert-butylphenol, 2-tert-butyl-6-tert-amyl phenol, 2-tert-butyl-6-(1,1,3,3-tetramethylbutyl)phenol, 2,6-di-(1,1,2,2-tetramethylpropyl)phenol and the like.

The aldehydes used in the process of this invention are aliphatic or aromatic aldehydes such as formaldehyde, acetaldehyde, propionaldehyde, butyraldehyde, isobutyraldehyde, isovaleraldehyde, benzaldehyde, ortho-tolualdehyde, meta-tolualdehyde, para-tolualdehyde, phenyl acetaldehyde, pivalic aldehyde, and the like.

In carrying out the condensation reaction the molecular ratio of the phenol to the aldehyde is advantageously maintained at approximately 2:1. This ratio is based upon the use of an aldehyde monomer. If an aldehyde polymer is employed, the amount of polymer used is based upon the moles of the monomer appearing in the polymer. For instance, if a trimer of isobutyraldehyde is condensed with an appropriate phenol the molecular ratio of this phenol to the trimer of isobutyraldehyde is about 6:1. Thus, generally speaking the principal reactants of the process of this invention are employed in stoichiometric equivalents of about two moles of phenol per mole of aldehyde. Deviations from these proportions are permissible and frequently advantageous. For example, when employing formaldehyde as the aldehyde reagent it is best to employ a slight excess in the range of about 1.2 moles of formaldehyde per 2 moles of phenol. When employing benzaldehyde as the aldehyde reagent at 1:1 mole ratio may be used.

The catalysts of the process of this invention are alkali metal hydroxides, namely, lithium hydroxide, sodium hydroxide, potassium hydroxide, rubidium hydroxide, and cesium hydroxide or mixtures thereof. Of these hydroxides, sodium hydroxide and potassium hydroxide are most readily available at lowest cost and are preferably employed. The amount of the alkali metal hydroxide catalyst used ranges from about 0.5 to about 3 percent by weight based on the weight of the phenol used in conducting the process. Slight deviations from these ranges of proportions are permissible, however, care should be used not to use too much alkali metal hydroxide catalyst because if this is done the yield of product may be reduced because of ether formation involving participation of the alcohol solvent.

The solvent used in the process of this invention consists essentially of a monohydric alcohol containing from 1 to about 8 carbon atoms. The alcohol need not be anhydrous and thus amounts of water which are normally present in commercial grades of alcohol can be tolerated without adverse effect. However, if the concentration of water in the alcohol becomes excessive, e. g. 20 percent by volume in ethanol, difficulties such as immiscibility of reaction medium may be encountered. Generally speaking, as the molecular weight of the alcohol increases, the amount of water which can be tolerated therein decreases. The alcohols which are used as reaction solvents according to the process of this invention comprise methanol, ethanol, propanol, isopropanol, butanol, isobutanol, sec-butanol, tert-butanol and the various pentanols, hexanols, heptanols and octanols. Mixtures of these alcohols may also be used, particularly mixtures of the isomeric forms of a given alcohol. The Oxo amyl alcohols serve as an example. As indicated above a particularly preferred embodiment of this invention involves recourse to isopropanol as the reaction solvent.

The amount of alcohol solvent employed in the process of this invention is not particularly critical so long as there are at least about 300 milliliters of alcohol per gram-mole of phenol employed in the reaction. By employing at least this quantity of alcohol solvent there is provided a reaction medium which is convenient insofar as stirring, filtering and other manipulative details are concerned. More importantly, however, is the fact that this minimum amount of alcohol constitutes a substantial excess in relation to the amount of catalyst employed. If such excess is not present, the yield of product is lowered. In fact, where not alcohol solvent is employed, no reaction occurs.

The process of this invention is conducted at temperatures ranging from about 20 to about 100° C. Thus, the choice of reaction temperature is largely governed by the boiling point of the alcohol solvent used. If desired, the reaction can be conducted at a temperature above the boiling point of the alcohol solvent if the reaction is conducted under super-atmospheric pressure sufficient to prevent loss of alcohol solvent—e. g. in the range of 2 to 3 atmospheres. Generally speaking, it is preferable to conduct the process of this invention at a temperature within the range of about 50 to about 60° C.

Whether the catalytic quantity of alkali metal hydroxide catalysts used in the process of this invention reacts partially or completely with the monohydric alcohol solvent to form the corresponding alkali metal alkoxide is not known. In any event, it is essential that the alkali metal hydroxide initially be present in catalytic quantity as defined herein and that excess alcohol be employed as the reaction solvent. If more than catalytic quantities of alkali metal hydroxide are used the yield of product will be lowered because of competing side reactions. If insufficient alcohol solvent is employed, the yield of product is also diminished.

Methods of preparing most of the materials used in the process of this invention are known and reported in the literature. To prepare certain of the 2,6-dialkyl phenols used in the process of this invention phenol or an appropriate mono-ortho-alkyl substituted phenol is alkylated with an olefinic hydrocarbon in the presence of an aluminum phenoxide catalyst.

We claim:

1. Process of preparing di-(3,5-dialkyl-hydroxyphenyl) methanes which comprises reacting at a temperature between about 20 and about 100° C. a dialkyl phenol having the formula:

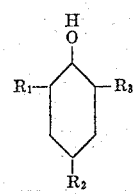

wherein $R_1$ is an alkyl radical containing from 3 to 8 carbon atoms and is branched on the alpha carbon atom and $R_2$ and $R_3$ are selected from the group consisting of hydrogen and alkyl radicals containing from 1 to 8 carbon atoms, one of $R_2$ and $R_3$ being hydrogen and the other being an alkyl radical containing from 1 to 8 carbon atoms, with an aldehyde having from 1 to 10 carbon atoms in the presence of from about 0.5 to about 3 percent by weight based on the weight of said phenol of an alkali metal hydroxide catalyst and in a solvent consisting essentially of a monohydric alcohol having from 1 to about 8 carbon atoms; there being present at least about 300 milliliters of said alcohol per gram mole of said phenol; said phenol and said aldehyde being in a mole ratio of approximately 2:1, respectively.

2. Process of preparing di-(3,5-dialkyl-4-hydroxyphenyl) methanes which comprises reacting at a temperature between about 20 and 100° C. a 2,6-dialkyl phenol in which one alkyl radical contains from 3 to 8 carbon atoms and is branched on the alpha carbon atom and the other alkyl radical contains from 1 to 8 carbon atoms with an aldehyde having from 1 to 10 carbon atoms in the presence of from about 0.5 to about 3 percent by weight based on the weight of said phenol of an alkali metal hydroxide catalyst and in a solvent consisting essentially of a monohydric alcohol having from 1 to about 8 carbon atoms; there being present at least about 300 milliliters of said alcohol per gram mole of said phenol; said phenol and said aldehyde being in a mole ratio of approximately 2:1, respectively.

3. Process of preparing di-(3,5-di-tert-alkyl-4-hydroxyphenyl) methanes which comprises reacting at a temperature between about 20 and about 100° C. a 2,6-di-tert-alkyl phenol with an aldehyde having from 1 to 10 carbon atoms in the presence of from about 0.5 to about 3 percent by weight based on the weight of said phenol of an alkali metal hydroxide catalyst and in a solvent consisting essentially of isopropanol, there being present at least about 300 milliliters of isopropanol per gram mole of said phenol; said phenol and said aldehyde being in a mole ratio of approximately 2:1, respectively.

4. Process of claim 3 wherein said 2,6-di-tert-alkyl phenol is 2,6-di-tert-butylphenol.

5. Process of preparing 1,1 - bis - (3,5 - di - tert - butyl-4-hydroxyphenyl)methane which comprises reacting at a temperature between about 50 and 60° C. 2,6-di-tert-butylphenol with formaldehyde in the presence of from about 0.5 to about 3 percent by weight based on the weight of said phenol of sodium hydroxide as catalyst and in a solvent consisting essentially of isopropanol; there being present at least about 300 milliliters of isopropanol per gram mole of said phenol; said 2,6-di-tert-butylphenol and said formaldehyde being in a mole ratio of approximately 2:1 respectively.

6. Process of preparing di-(3,5-dialkyl-4-hydroxyphenyl) methanes which comprises reacting at a temperature between about 20 and 100° C. a 2,6-dialkyl phenol in which one alkyl radical contains from 3 to 8 carbon atoms and is branched on the alpha carbon atom and the other alkyl radical contains from 1 to 8 carbon atoms with formaldehyde in the presence of from about 0.5 to about 3 percent by weight based on the weight of said phenol of an alkali metal hydroxide catalyst and in a solvent consisting essentially of a monohydric alcohol having from 1 to about 8 carbon atoms; there being present at least about 300 milliliters of said alcohol per gram mole of said phenol; said phenol and said formaldehyde being in a mole ratio of approximately 2:1, respectively.

7. Process of claim 6 wherein said 2,6 - dialkyl phenol is 2,6-di-tert-butyl phenol.

8. Process of claim 6 wherein said 2,6-dialkyl phenol is 2-methyl-6-tert-butyl phenol.

9. Process of claim 6 wherein shaid 2,6-dialkyl phenol is 2,6-diisopropyl phenol.

10. Process of preparing di - (3,5 - dialkyl - 2 - hydroxyphenyl) methanes which comprises reacting at a temperature between about 20 and 100° C. a 2,4-dialkyl phenol wherein the alkyl radical ortho to the hydroxyl group contains from 3 to 8 carbon atoms and is branched on the alpha carbon atom and the other alkyl group contains from 1 to 8 carbon atoms with an aldehyde having from 1 to 10 carbon atoms in the presence of from about 0.5 to about 3 percent by weight based on the weight of said phenol of an alkali metal hydroxide catalyst and in a solvent consisting essentially of a monohydric alcohol having from 1 to about 8 carbon atoms; there being present at least about 300 milliliters of said alcohol per gram mole of said phenol; said phenol and said aldehyde being in a mole ratio of approximately 2:1, respectively.

11. Process of claim 10 wherein said alkyl radical ortho to said hydroxyl group is tertiary butyl.

12. Process of claim 10 wherein said phenol is 2-tert-butyl-4-methyl phenol and said aldehyde is formaldehyde.

References Cited in the file of this patent

UNITED STATES PATENTS

| | | |
|---|---|---|
| 1,800,296 | Honel | Apr. 14, 1931 |
| 2,397,018 | Kroeger et al. | Mar. 19, 1946 |
| 2,647,102 | Ambelang | July 28, 1953 |
| 2,734,088 | Knowles et al. | Feb. 7, 1956 |